US012811410B2

(12) United States Patent
Kikuchi

(10) Patent No.: US 12,811,410 B2
(45) Date of Patent: Nov. 24, 2026

(54) POWER STORAGE SYSTEM

(71) Applicant: TOYOTA JIDOSHA KABUSHIKI KAISHA, Toyota (JP)

(72) Inventor: Yoshiaki Kikuchi, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 716 days.

(21) Appl. No.: 18/359,072

(22) Filed: Jul. 26, 2023

(65) Prior Publication Data

US 2024/0128788 A1 Apr. 18, 2024

(30) Foreign Application Priority Data

Oct. 12, 2022 (JP) ................................ 2022-163983

(51) Int. Cl.
*H02J 7/10* (2006.01)
*H01M 10/42* (2006.01)
*H01M 10/44* (2006.01)
*H01M 10/48* (2006.01)
*H02J 7/34* (2006.01)
*H02J 7/80* (2026.01)

(52) U.S. Cl.
CPC ........... *H02J 7/342* (2020.01); *H01M 10/425* (2013.01); *H01M 10/441* (2013.01); *H01M 10/443* (2013.01); *H01M 10/482* (2013.01); *H01M 10/486* (2013.01); *H02J 7/80* (2026.01); *H02J 2207/20* (2020.01)

(58) Field of Classification Search
CPC .......... H02J 7/342; H02J 7/80; H02J 2207/20; H02J 7/585; H02J 7/90; H02J 7/443; H02J 7/50; H02J 7/61; H02J 7/63; H02J 7/82; H02J 7/933; H02J 7/975; H01M 10/425; H01M 10/441; H01M 10/443; H01M 10/482; H01M 10/486
See application file for complete search history.

(56) References Cited

U.S. PATENT DOCUMENTS

2012/0091966 A1 4/2012 Mori
2015/0333544 A1* 11/2015 Toya .................... G01R 31/387
320/112

FOREIGN PATENT DOCUMENTS

JP 2008-278624 A 11/2008
JP 2010-142040 A 6/2010
JP 2011-188700 A 9/2011
JP 2012-085487 A 4/2012
JP 2013-169051 A 8/2013
(Continued)

*Primary Examiner* — Jamara A Franklin
(74) *Attorney, Agent, or Firm* — SoraIP, Inc.

(57) ABSTRACT

A power storage system that performs charging and discharging with an external system includes a power converter, a plurality of assembled batteries, and a control device. The control device operates the power converter to supply power from the designated first assembled battery of the plurality of assembled batteries to the designated at least one second assembled battery of the plurality of assembled batteries to completely discharge the first assembled battery. The control device operates the power converter to power the first assembled battery from the at least one second assembled battery to fully charge the first assembled battery. The control device calculates the full charge capacity of the first assembled battery based on the transition from the fully discharged state to the fully charged state.

2 Claims, 6 Drawing Sheets

(56) References Cited

FOREIGN PATENT DOCUMENTS

| | | | |
|---|---|---|---|
| JP | 2014-103804 | A | 6/2014 |
| JP | 2014-110692 | A | 6/2014 |

* cited by examiner

POWER STORAGE SYSTEM

CROSS-REFERENCE TO RELATED APPLICATION

This application claims priority to Japanese Patent Application No. 2022-163983 filed on Oct. 12, 2022 incorporated herein by reference in its entirety.

BACKGROUND

1. Technical Field

The present disclosure relates to a power storage system.

2. Description of Related Art

Japanese Unexamined Patent Application Publication No. 2014-103804 (JP 2014-103804 A) discloses a battery system in which a plurality of assembled batteries is connected in parallel.

SUMMARY

In the system as disclosed in JP 2014-103804 A, it is desired to accurately grasp the full charge capacity of the assembled batteries from the viewpoint of suppressing overcharge and overdischarge of the assembled batteries.

The present disclosure has been made in order to solve the above-described problem, and an object thereof is to accurately grasp a full charge capacity of an assembled battery.

According to an aspect of the present disclosure, a power storage system that performs charging and discharging with an external system includes: a power converter; a plurality of assembled batteries connected in parallel with each other to the power converter; and a control device that controls an operation of the power converter. The control device operates the power converter such that power is supplied from a designated first assembled battery of the plurality of the assembled batteries to at least one designated second assembled battery of the plurality of the assembled batteries to fully discharge the first assembled battery. The control device operates the power converter such that power is supplied from the at least one second assembled battery to the first assembled battery to fully charge the first assembled battery. The control device calculates a full charge capacity of the first assembled battery based on a transition from a fully discharged state to a fully charged state.

According to the above configuration, since the full charge capacity of the first assembled battery is calculated by transitioning the first assembled battery from the fully discharged state to the fully charged state, the full charge capacity of the first assembled battery can be accurately grasped.

The control device preferably stores information for specifying a length of a wire between the first assembled battery and a remaining plurality of assembled batteries excluding the first assembled battery from the plurality of the assembled batteries. The control device designates, based on the information, an assembled battery having the shortest length of a wire with respect to the first assembled battery among the remaining plurality of the assembled batteries, as one of the at least one second assembled battery.

According to the above configuration, it is possible to shorten the length of the wire used for charging and discharging the first assembled battery. Therefore, it is possible to reduce the amount of power loss in measuring the full charge capacity of the first assembled battery as compared with the case where an assembled battery other than the second assembled battery designated as the discharge destination and the charge source is used.

The power storage system preferably further includes a sensor device that measures a temperature of each of the plurality of the assembled batteries. The control device designates an assembled battery having the highest temperature among the remaining plurality of the assembled batteries excluding the first assembled battery from the plurality of the assembled batteries, as one of the at least one second assembled battery.

According to the above configuration, it is possible to reduce the electric resistance at the time of charging and discharging of the first assembled battery. Therefore, it is possible to reduce the amount of power loss in measuring the full charge capacity of the first assembled battery as compared with the case where an assembled battery other than the second assembled battery designated as the discharge destination and the charge source is used.

According to the above disclosure, it is possible to accurately grasp the full charge capacity of the assembled battery.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
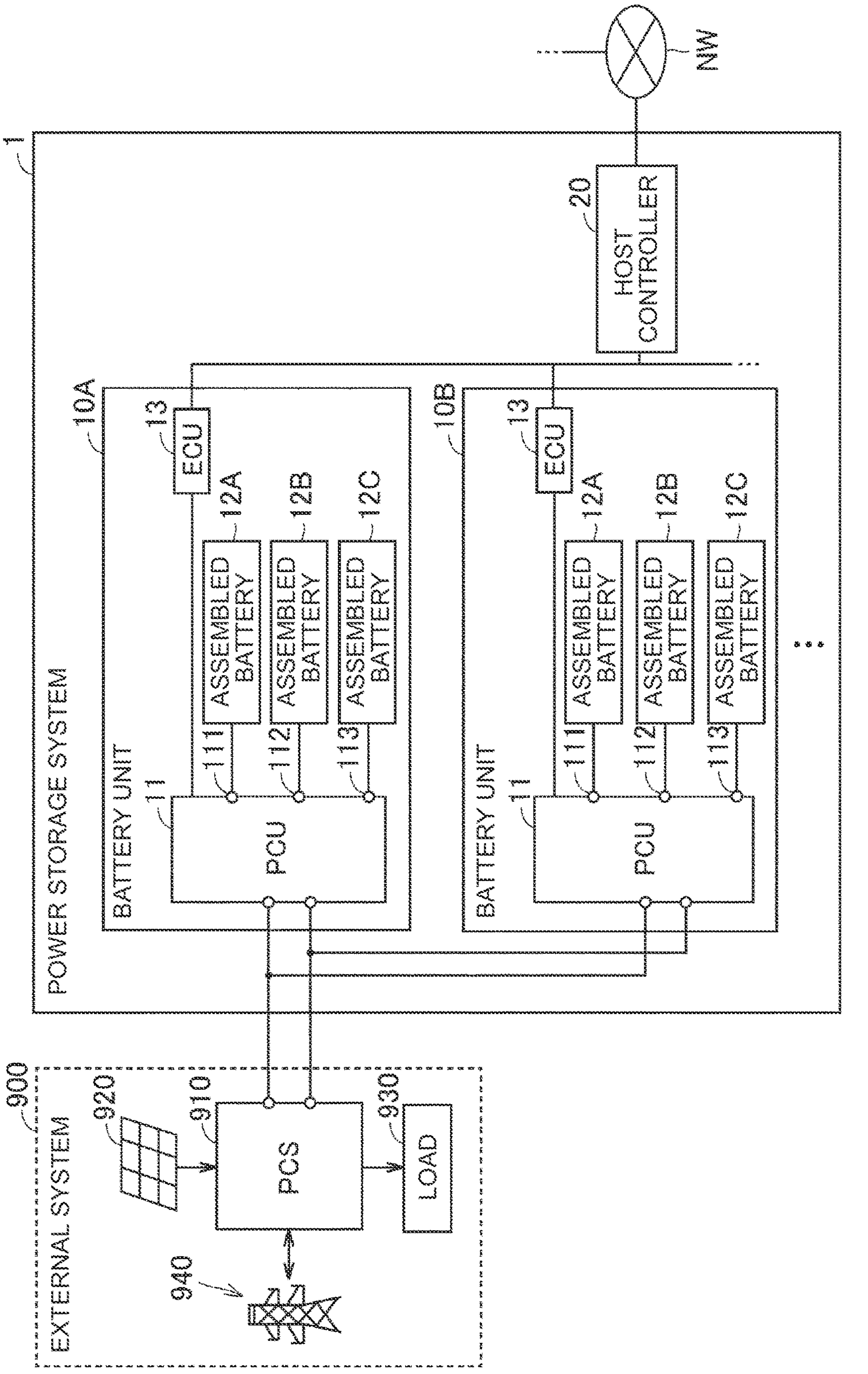
FIG. 1 is a diagram for explaining a configuration of a power storage system and an external system.

Hereinafter, embodiments of the present disclosure will be described with reference to the drawings. In the following description, the same members are denoted by the same reference numerals. Their names and functions are also the same. Therefore, detailed description of the same parts will not be repeated.

A. Entire Configuration

FIG. 1 is a diagram for explaining a configuration of a power storage system and an external system. As illustrated in FIG. 1, the power storage system 1 is connected to an external system 900 by a power line. The power storage system 1 can be supplied with power from the external system 900 and can be discharged to the external system 900.

The power storage system 1 includes a plurality of battery units 10A, 10B, . . . and a host controller 20. In the following description, any one of the plurality of battery units 10A, 10B, . . . is also referred to as "battery unit 10".

The battery unit 10A includes a Power Control Unit (PCU) 11, an assembled battery 12A and an assembled battery 12B, an assembled battery 12C, and an Electronic Control Unit (ECU) 13.

PCU 11 is a power converter including inverters, DC/DC converters, and the like. In the battery unit 10A, three assembled batteries 12A, 12B, 12C are connected in parallel to PCU 11. In particular, the battery unit 10A has three terminals 111, 112, 113 for external connection of PCU 11. The assembled battery 12A is connected to the terminal 111 of the three terminals. The assembled battery 12B is connected to the terminal 112. The assembled battery 12C is connected to the terminal 113.

The assembled battery 12A, 12B, 12C is obtained by packing a plurality of unit batteries of the same type (also referred to as "battery cells"). The assembled battery 12A, 12B, 12C is also referred to as a "battery pack". Each of the assembled batteries 12A, 12B, 12C is, for example, a ternary lithium ion battery (hereinafter, referred to as a "ternary battery") or an iron phosphate lithium ion battery (hereinafter, referred to as a "LFP battery").

The battery unit 10B includes a PCU 11, an assembled battery 12A, 12B, 12C, and an ECU 13, similarly to the battery unit 10A. In the battery unit 10B, the type of the assembled battery connected to PCU 11 may be different from that of the battery unit 10A. For example, the battery unit 10A may include, as an assembled battery 12A, 12B, 12C, two ternary batteries and one LFP cell, and the battery unit 10B may include, as an assembled battery 12A, 12B, 12C, one ternary battery and two LFP cells. The combination of assembled batteries included in each battery unit 10 is not particularly limited.

In the following description, any one of the plurality of assembled battery 12A, 12B, 12C is also referred to as "assembled battery 12".

In the present embodiment, PCU and ECU mounted on the vehicles are diverted as PCU 11 and ECU 13, respectively. Similarly, assembled batteries mounted on vehicles are diverted as assembled battery 12A, 12B, 12C. As described above, the power storage system 1 is constructed by using the components of the vehicle that have become unnecessary. Specifically, the three-phase AC motor connected to PCU of the vehicles is removed, and three assembled batteries (one for each of the U-layer, the V-layer, and the W-layer) are connected. The terminals 111, 112, 113 are terminals for the U layer, terminals for the V layer, and terminals for the W layer, respectively.

The external system 900 includes a Power Conditioning System (PCS) 910, a photovoltaic device 920, loads 930, and a power system 940. The respective battery units 10 (specifically, the respective PCU 11) are connected in parallel to each other with respect to PCS 910.

A PCS 910 is a power converter capable of both AC/DC conversion (AC-to-DC conversion) and DC/AC conversion (DC-to-AC conversion). PCS 910 receives DC power from the photovoltaic device 920, for example. PCS 910 provides AC power to the loads 930. It should be noted that the load 930 includes an electric product (for example, an air conditioner, a lighting fixture, and the like) used in a home. PCS 910 exchanges AC power with the power system 940.

The respective ECUs 13 include a processor and a memory, and control the battery unit 10. ECU 13 is communicatively connected to the host controllers 20.

The higher-level controllers 20 include a processor and a memory (neither of which is shown), and send commands to the respective ECUs 13. The higher-level controllers 20 are communicatively connected to servers (not shown) via a networked NW.

In the power storage system 1, each battery unit 10 is charged by the external system 900 at least during the midnight time period, and is discharged to the external system 900 at least during the daytime time period. Specifically, each battery unit 10 discharges each of the three assembled batteries 12 from the external system 900 at least during the midnight time period and to the external system 900 at least during the daytime time period.

B. Outline of Process

Figure 2A:
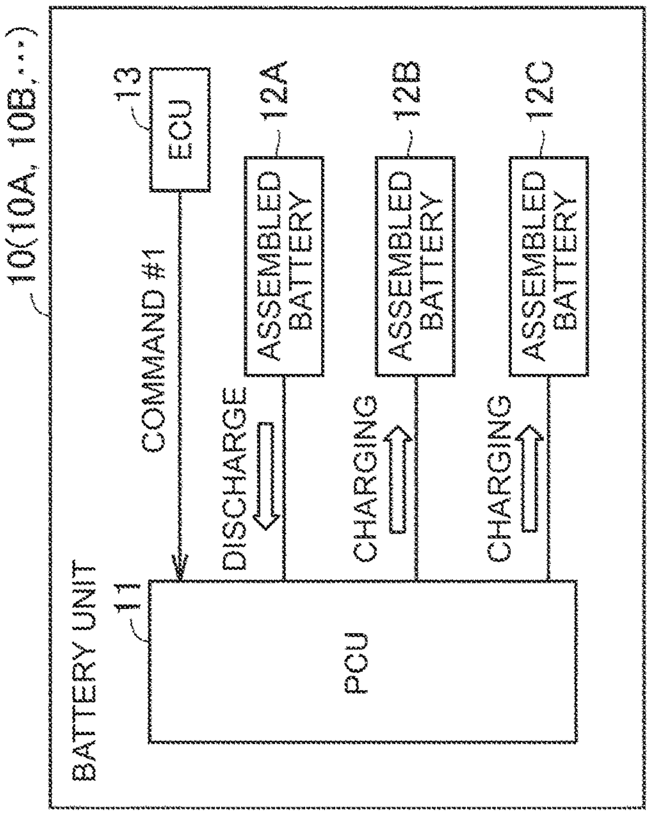
FIG. 2A is a diagram for explaining the process of measuring the full charge capacity of the assembled battery.
Figure 2B:
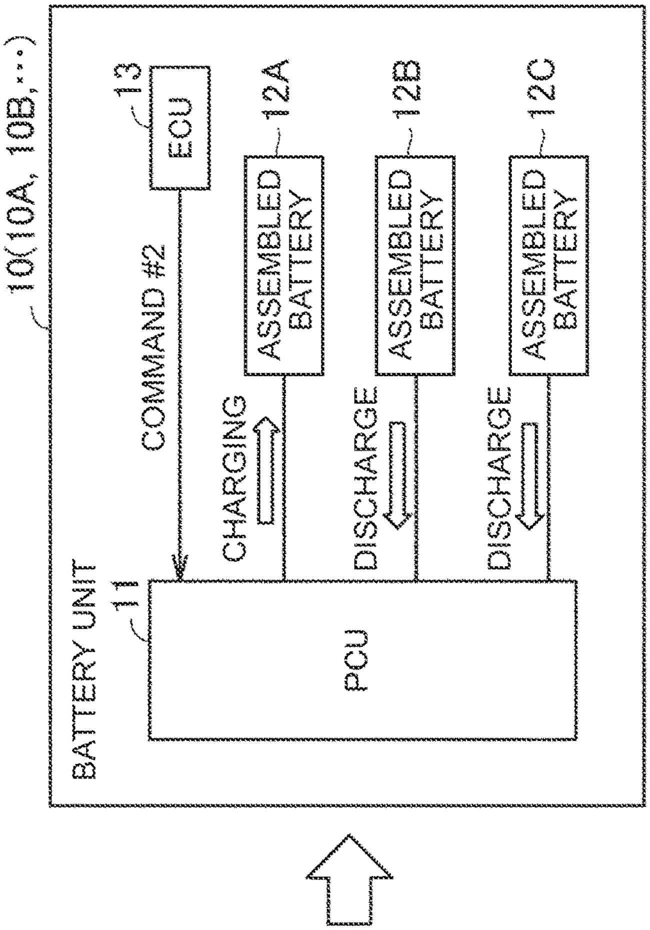
FIG. 2B is a diagram for explaining the process of measuring the full charge capacity of the assembled battery.

FIGS. 2A and 2B are diagrams for describing a process for measuring a full charge capacity of an assembled battery 12A. As shown in FIG. 2A, ECU 13 completely discharges the assembled battery 12A by operating 12B, 12C to power the assembled battery PCU 11 from the assembled battery 12A. ECU 13 typically determines whether the assembled battery 12A has fully discharged (State Of Charge (SOC) =0%) based on the voltage of the assembled battery 12A.

Thereafter, as shown in FIG. 2B, ECU 13 fully charges the assembled battery 12B, 12C to fully charge the assembled battery 12A by operating PCU 11 to power the assembled battery 12A. ECU 13 typically determines whether the assembled battery 12A is fully charged (State Of Charge (SOC)=100%) based on the voltage of the assembled battery 12A.

ECU 13 calculates (specifies) Full Charge Capacity (FCC) of the assembled battery 12A based on the transition from the fully discharged state to the fully charged state. ECU 13 can typically calculate the full charge capacity using a current measuring method (Coulomb counter method, current integrating method). Specifically, ECU 13 can calculate the full charge capacity by determining the amount of charge that has flowed into the assembled battery 12A from the full discharge to the full charge state (specifically, integrating the current value in time).

When the full charge capacity of the assembled battery 12B, 12C is measured, the same process as that of the assembled battery 12A is performed.

C. Control Structure

Figure 3:
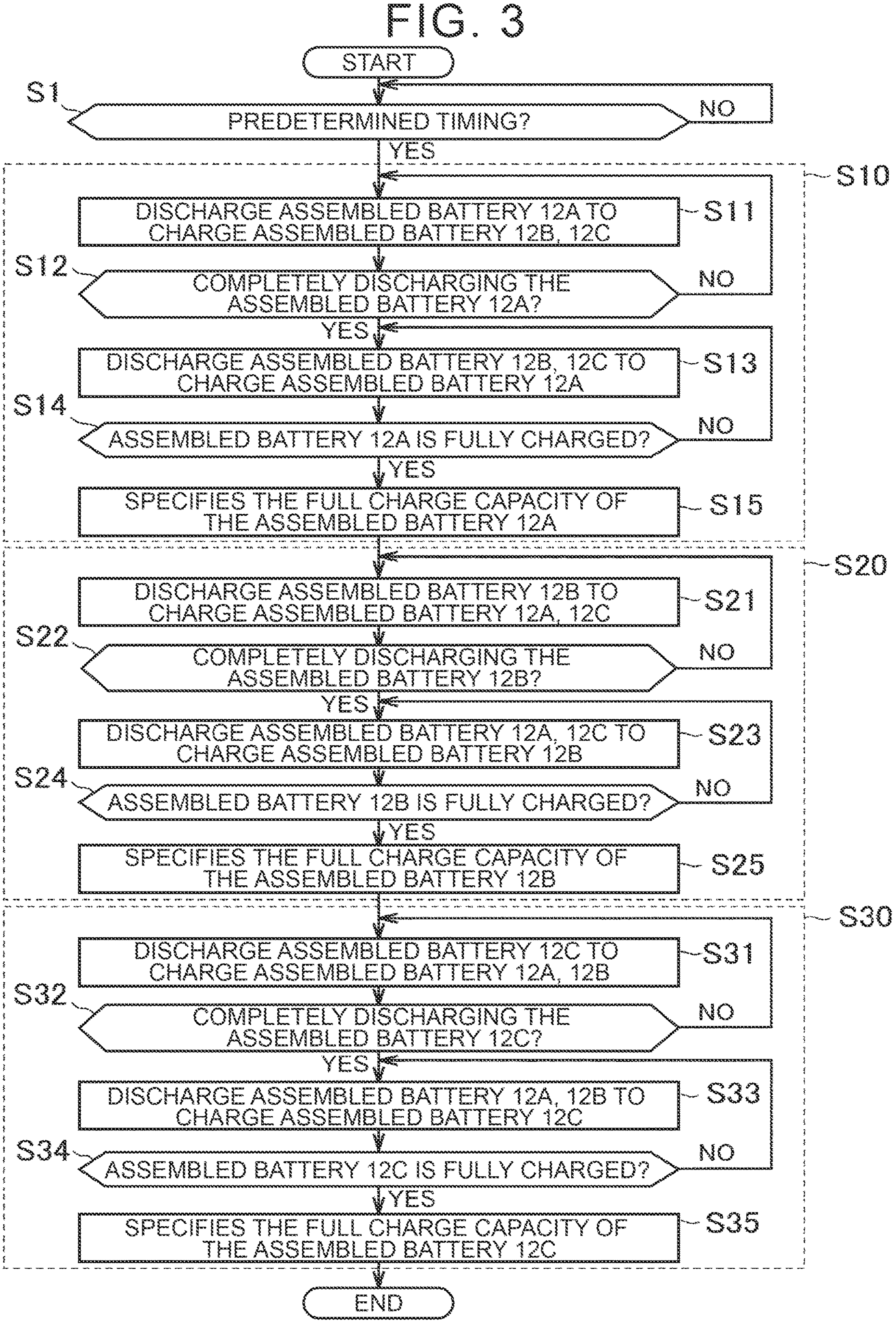
FIG. 3 is a flow chart for explaining a flow of processing in the case of measuring the full charge capacity of three assembled batteries.

FIG. 3 is a flowchart for explaining a flow of a process when the full charge capacitances of three assembled batteries 12A, 12B, 12C are measured. Each S10, S20, S30 is a step for measuring the full charge capacity of the assembled battery 12A, 12B, 12C. As shown in FIG. 3, S10 includes S11 to S15. S20 includes S21 to S25. S30 includes S31 to S35.

In S1, ECU 13 determines whether or not a predetermined timing has been reached. The predetermined timing includes, for example, any one of time periods in which charging and discharging are not performed with the external system 900.

In S11, ECU 13 discharges the assembled battery 12A to charge the assembled batteries 12B, 12C. In S12, ECU 13 determines whether the assembled battery 12A has been completely discharged. When ECU 13 determines that the assembled battery 12A has been completely discharged (YES in S12), it charges the assembled battery 12A by discharging the assembled battery 12B, 12C in S13. ECU 13 continues discharging the assembled battery 12A until the assembled battery 12A is completely discharged when it is determined that the assembled battery 12A is not completely discharged (NO in S12).

In S14, ECU 13 determines whether or not the assembled battery 12A is fully charged. When ECU 13 determines that the assembled battery 12A is fully charged (YES in S14), it specifies the full charge capacity of the assembled battery 12A in S15. ECU 13 continues to charge the assembled battery 12A until the assembled battery 12A is fully charged when it is determined that the assembled battery 12A is not fully charged (NO in S14).

As a result, the full charge capacity of the assembled battery 12A is measured. Next, ECU 13 executes S25 from the respective S21 included in S20.

In S21, ECU 13 discharges the assembled battery 12B to charge the assembled battery 12A, 12C. In S22, ECU 13 determines whether the assembled battery 12B has been completely discharged. When ECU 13 determines that the assembled battery 12B has been completely discharged (YES in S22), it charges the assembled battery 12B by discharging the assembled battery 12A, 12C in S23. ECU 13 continues discharging the assembled battery 12B until the assembled battery 12B is completely discharged when it is determined that the assembled battery 12B is not completely discharged (NO in S22).

In S24, ECU 13 determines whether or not the assembled battery 12B is fully charged. When ECU 13 determines that the assembled battery 12B is fully charged (YES in S24), it specifies the full charge capacity of the assembled battery 12B in S25. ECU 13 continues to charge the assembled battery 12B until the assembled battery 12B is fully charged when it is determined that the assembled battery 12B is not fully charged (NO in S24).

As a result, the full charge capacity of the assembled battery 12B is measured. Next, ECU 13 executes S35 from the respective S31 included in S30.

In S31, ECU 13 discharges the assembled battery 12C to charge the assembled batteries 12A, 12B. In S12, ECU 13 determines whether the assembled battery 12C has been completely discharged. When ECU 13 determines that the assembled battery 12C has been completely discharged (YES in S32), it charges the assembled battery 12C by discharging the assembled battery 12A, 12B in S33. ECU 13 continues discharging the assembled battery 12C until the assembled battery 12C is completely discharged when it is determined that the assembled battery 12C is not completely discharged (NO in S32).

In S34, ECU 13 determines whether or not the assembled battery 12C is fully charged. When ECU 13 determines that the assembled battery 12C is fully charged (YES in S34), it specifies the full charge capacity of the assembled battery 12C in S35. ECU 13 continues to charge the assembled battery 12C until the assembled battery 12C is fully charged when it is determined that the assembled battery 12C is not fully charged (NO in S34). As a result, the full charge capacity of the assembled battery 12C is measured.

In the above description, a configuration in which the processes of S10, S20, and S30 are consecutive has been exemplified, but the present disclosure is not limited thereto. Also, the order of S10, S20, and S30 is not limited to the above.

Timing for executing S10, S20, and S30 may be set individually. ECU 13 may be configured to execute S10 when a timing Ta is made, execute S20 when a timing Tb is made, and execute S30 when a timing Tc is made.

D. Interim Conclusions

The power storage system 1 will be described below. As described above, the power storage system 1 performs charging and discharging with respect to the external system 900. The power storage system 1 includes a PCU 11, a plurality of assembled batteries 12 (in the present embodiment, three assembled battery 12A, 12B, 12C) connected in parallel to each other in PCU 11, and an ECU 13 for controlling the operation of PCU 11.

ECU 13 operates PCU 11 to power a designated first assembled battery (e.g., the assembled battery 12A in the example of FIG. 1) of the plurality of assembled batteries 12 to at least a designated second assembled batteries (e.g., the remaining assembled battery 12B, 12C in the example of FIG. 1) of the plurality of assembled batteries to fully discharge the first assembled battery.

ECU 13 operates PCU 11 to power the first assembled battery from the at least one second assembled battery to fully charge the first assembled battery. ECU 13 calculates (specifies) the full charge capacity of the first assembled battery based on the transition from the fully discharged state to the fully charged state.

According to this configuration, since the full charge capacity of the first assembled battery is calculated by shifting the first assembled battery from the state of complete discharge to the state of full charge, the full charge capacity of the first assembled battery can be accurately grasped.

E. Modified Example e1. First Modification

In the above, for example, when measuring the full charge capacity of the assembled battery 12A, the remaining two assembled batteries 12B, 12C in the battery unit 10 were used. However, the present disclosure is not limited thereto.

For example, when the full charge capacity of the assembled battery 12A is larger than the full charge capacity of the assembled battery 12B and the present battery capacity of the assembled battery 12B is smaller than the full charge capacity of the assembled battery, the full charge capacity of the assembled battery 12A can also be measured using only the assembled battery 12B of the two assembled batteries 12B, 12C. Note that such a modification can also be applied to a modification described later.

e2. Second Modification

In the above, the configuration in which the three assembled batteries 12 are connected to PCU 11 has been described. In the following, measuring the full charge capacity in a configuration in which more assembled batteries 12 are connected to PCU will be described. In particular, a configuration using wiring length information will be described.

Figures 4A, 4B:
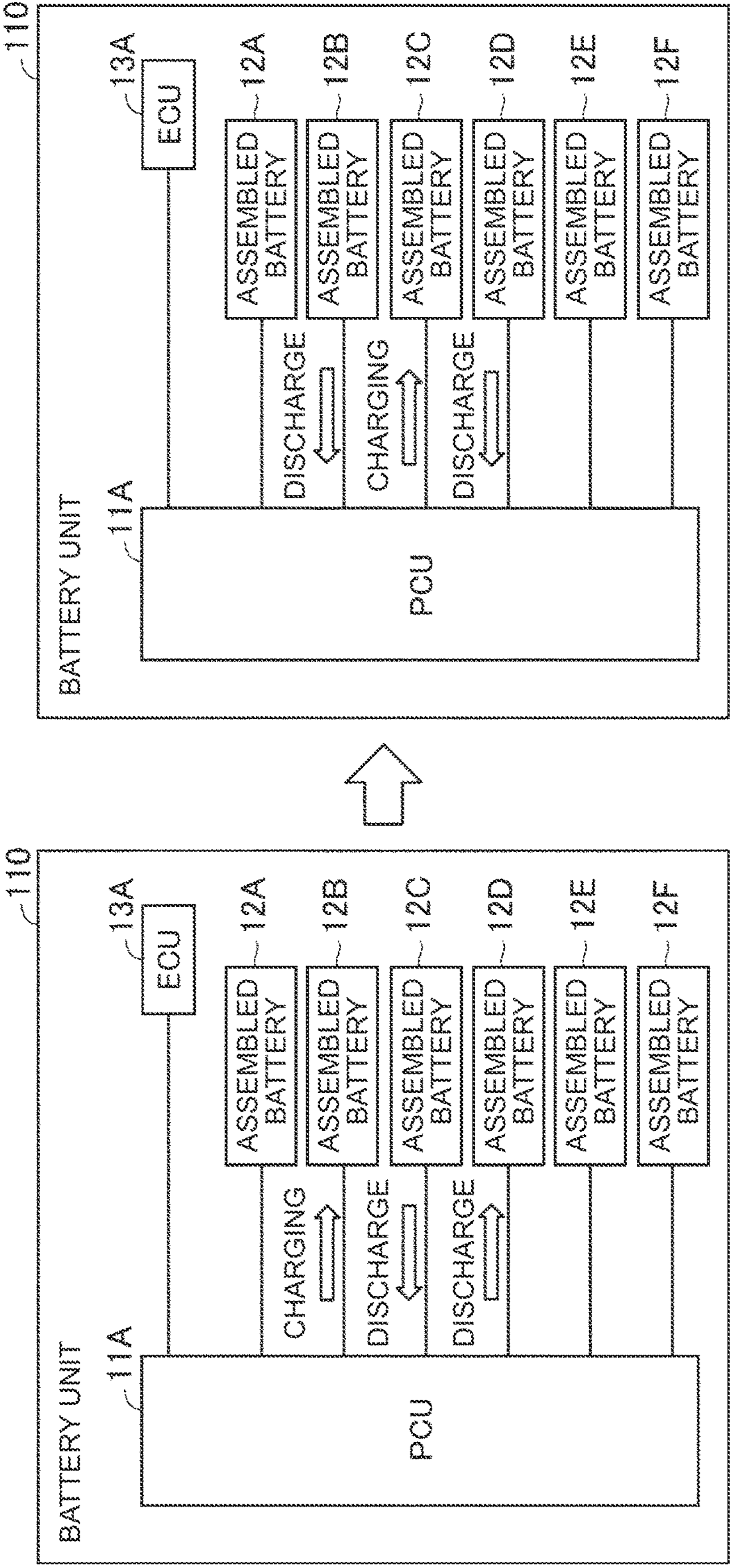
FIG. 4A is a diagram for explaining another process of measuring the full charge capacity of the assembled battery.
FIG. 4B is a diagram for explaining another process of measuring the full charge capacity of the assembled battery.

FIGS. 4A and 4B are diagrams for describing a process for measuring a full charge capacity of an assembled battery 12C. As shown in FIGS. 4A and 4B, the battery unit 110 includes a PCU 11A, six assembled battery 12 (12A to 12F), and an ECU 13A. PCU 11A has the same function as PCU 11 except that the number of connectable assembled batteries 12 differs from PCU 11.

Figure 5:
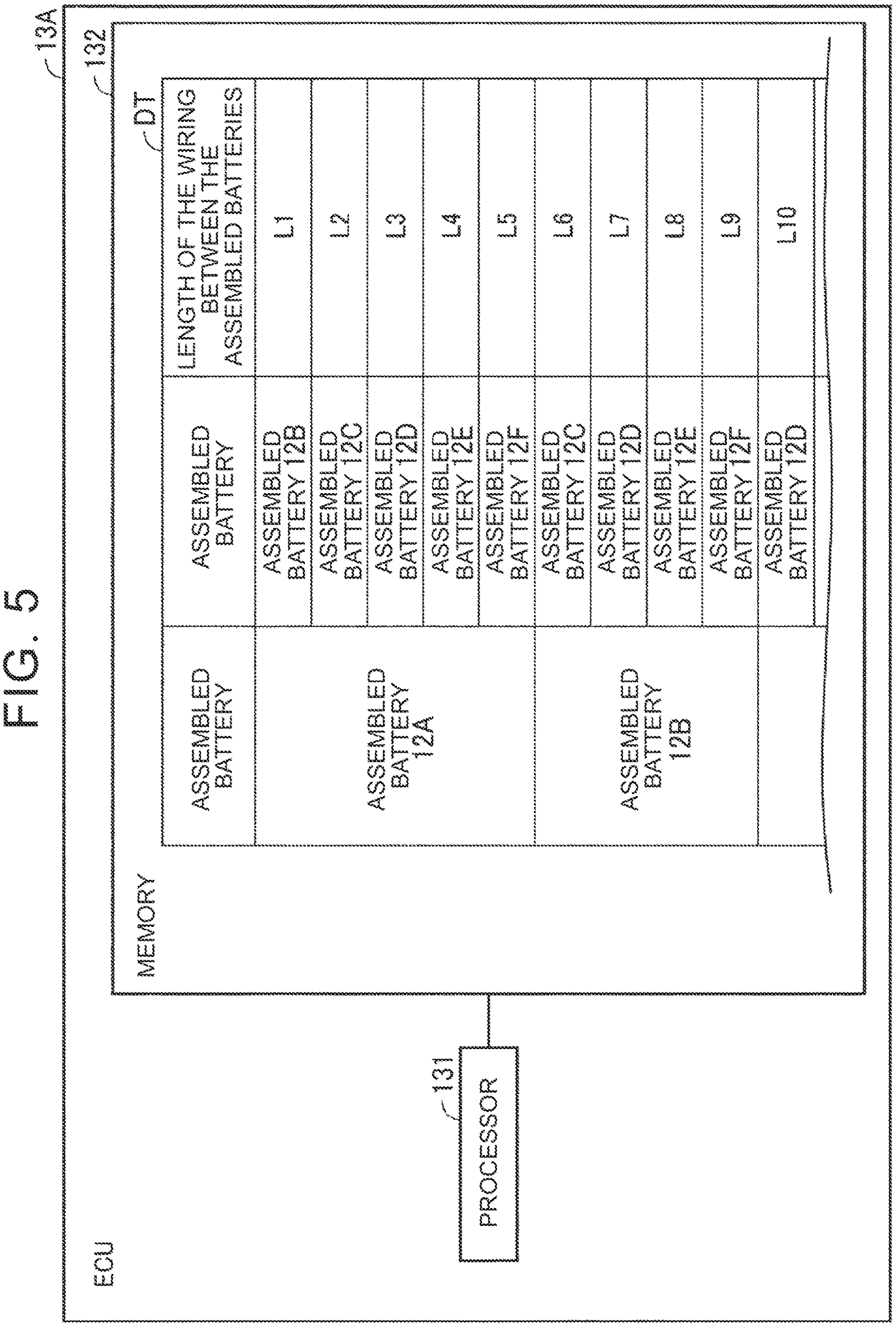
FIG. 5 is a diagram illustrating a configuration of an ECU.

FIG. 5 is a diagram illustrating a configuration of an ECU 13A. As shown in FIG. 5, ECU 13 includes a processor 131 and memories 132. The memory 132 stores a data table DT. In the data table DT, the length of the wire between the two assembled batteries 12 out of the six assembled batteries 12 is stored.

In the present embodiment, since the six assembled batteries 12 are connected to PCU 11A, 15 pieces of information (L15 from L1) are stored in the data table DT. In the following description, the wire lengths of the assembled battery 12C and the remaining five assembled batteries 12A, 12B, 12D, 12E, 12F are L2, L6, L10, L11, L12. In addition, for convenience of explanation, it is L6<L10<L2<L11<L12.

When ECU 13A measures the full charge capacity of the assembled battery 12C, the two assembled batteries 12 are used in the present embodiment as the discharge destination and the charge source. Specifically, ECU 13A selects the assembled battery 12B having the shortest wiring length with respect to the assembled battery 12C and the assembled battery 12D having the next shorter wiring length from among the remaining five assembled batteries 12.

Thus, when measuring the full charge capacity of the assembled battery 12C, as shown in FIG. 4A, ECU 13A completely discharges the assembled battery 12C by operating PCU 11A to power the assembled battery 12B, 12D from the assembled battery 12C. Thereafter, as shown in FIG. 4B, ECU 13A fully charges the assembled battery 12B, 12D to fully charge the assembled battery 12C by operating PCU 11A to power the assembled battery 12C. ECU 13A calculates the full charge capacity of the assembled battery 12C based on the transition from the fully discharged state to the fully charged state.

As described above, focusing on the measurement of the full charge capacity of the assembled battery 12C, it can be said that ECU 13A has the following configuration. ECU 13A stores information for specifying a length of a wire between the assembled battery 12C and the remaining plurality of assembled battery 12A, 12B, 12D, 12E, 12F. ECU 13A identifies (designates) the assembled battery 12B having the shortest wire length with respect to the assembled battery 12C among the remaining plurality of assembled battery 12A, 12B, 12D, 12E, 12F and the next shorter assembled battery 12D as the discharge destination and the charge source.

According to such a configuration, it is possible to shorten the length of the wire used for charging and discharging the assembled battery 12C. Therefore, compared with the case where two assembled batteries 12 other than the assembled battery 12B, 12D are used as the discharge destination and the charge source, it is possible to reduce the amount of power lost when the full charge capacity of the assembled battery 12C is measured.

In the above description, for the sake of convenience of description, the process of measuring the full charge capacity of the assembled battery 12C is exemplified, but the present disclosure is not limited thereto. The selection process of the discharging destination and the charging source as described above can also be applied to measuring the full charge capacity of another assembled battery 12A, 12B, 12D, 12E, 12F.

Further, in the above, when the full charge capacity of the assembled battery 12 is measured, two assembled batteries 12 are used as a discharge destination and a charge source target, but the present disclosure is not limited thereto. When the full charge capacity of the assembled battery 12 is measured, three or more assembled batteries 12 may be used as a discharge destination and a charge source.

e3. Third Modification

Figure 6B:
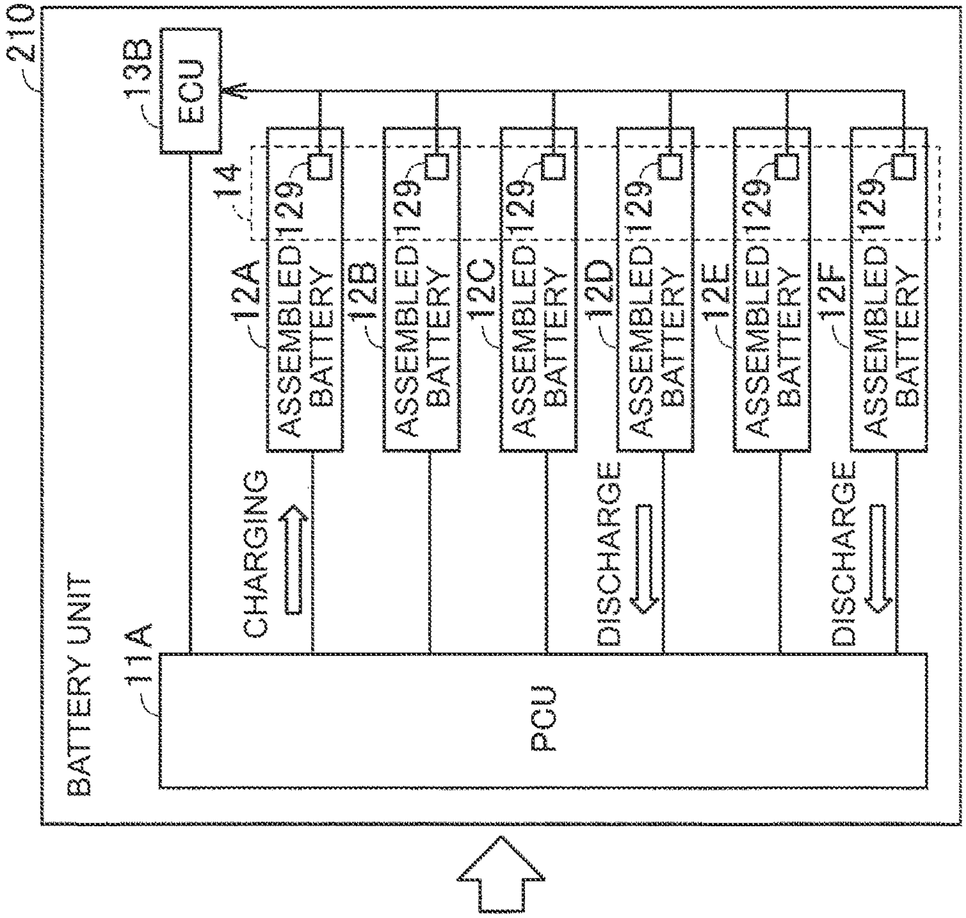
FIG. 6B is a diagram for explaining still another process when measuring the full charge capacity of the assembled battery.
Figure 6A:
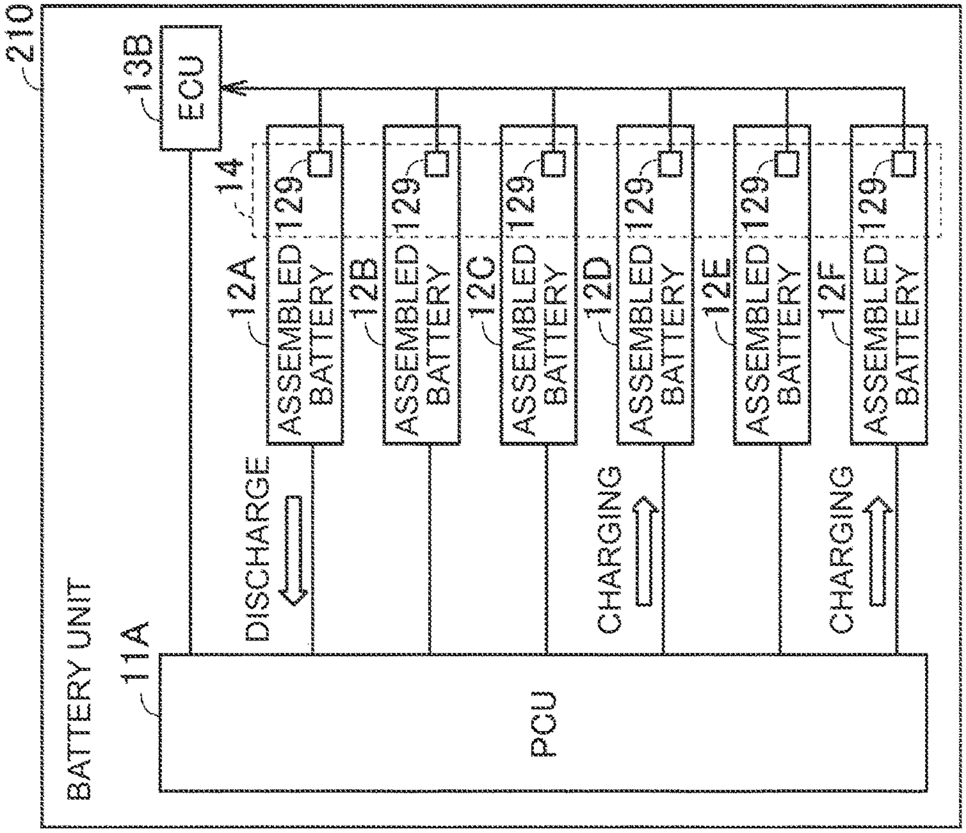
FIG. 6A is a diagram for explaining still another process of measuring the full charge capacity of the assembled battery.

FIGS. 6A and 6B are diagrams for describing a process for measuring a full charge capacity of an assembled battery 12A. As shown in FIGS. 6A and 6B, the battery unit 210 includes a PCU 11A, six assembled batteries 12 (12A to 12F), and an ECU 13B.

Specifically, the battery unit 210 includes a sensor device 14 that measures the temperature of each of the six assembled batteries 12. Each assembled battery 12 has a temperature sensor 129. The sensor device 14 includes six temperature sensors 129. Hereinafter, a configuration using a detection result of each temperature sensor 129 will be described.

Each temperature sensor 129 measures the temperature of the assembled battery 12. The respective temperature sensors 129 periodically notify ECU 13B of the measured data.

When ECU 13B measures the full charge capacity of the assembled battery 12A, the two assembled batteries 12 are used in the present embodiment as the discharge destination and the charge source. Specifically, ECU 13B selects the assembled battery having the highest temperature and the assembled battery having the next highest temperature of the plurality of assembled batteries 12B to 12F excluding the assembled battery 12A based on the temperature information acquired from the respective temperature sensors 129. For example, if the temperature of the assembled battery 12D is highest and then the temperature of the assembled battery 12F is high, ECU 13B selects two assembled batteries 12D, 12F.

Thus, when measuring the full charge capacity of the assembled battery 12A, as shown in FIG. 6A, ECU 13B completely discharges the assembled battery 12A by operating PCU 11A to power the assembled battery 12D, 12F from the assembled battery 12A. Thereafter, as shown in FIG. 6B, ECU 13B fully charges the assembled battery 12D, 12F to fully charge the assembled battery 12A by operating PCU 11A to power the assembled battery 12A. ECU 13B calculates the full charge capacity of the assembled battery 12A based on the transition from the fully discharged state to the fully charged state.

As described above, ECU 13B selects, from the remaining plurality of assembled batteries 12B to 12F excluding the assembled battery 12A from the plurality of assembled batteries 12, the assembled battery 12D having the highest temperature and the assembled battery 12F having the next highest temperature. According to such a configuration, it is possible to reduce the electric resistivity at the time of charging and discharging the assembled battery 12A. Therefore, compared with the case where two assembled batteries 12 other than the assembled battery 12D, 12F are used as the discharge destination and the charge source, it is possible to reduce the amount of power lost when the full charge capacity of the assembled battery 12A is measured.

In the above description, for the sake of convenience of description, the process of measuring the full charge capacity of the assembled battery 12A is exemplified, but the present disclosure is not limited thereto. The selection process of the discharging destination and the charging source as described above can also be applied to measuring the full charge capacity of the other assembled batteries 12B to 12F.

Further, in the above, when the full charge capacity of the assembled battery 12 is measured, two assembled batteries 12 are used as a discharge destination and a charge source target, but the present disclosure is not limited thereto. When the full charge capacity of the assembled battery 12 is measured, three or more assembled batteries 12 may be used as a discharge destination and a charge source.

F. Addendum (1) A control method in a power storage system for performing charging and discharging with an external system, the control method including: a step of operating, by a control device, the power converter such that power is supplied from a designated first assembled battery of the plurality of the assembled batteries to at least one designated second assembled battery of the plurality of the assembled batteries to fully discharge the first assembled battery; a step of operating, by the control device, the power converter such that power is supplied from the at least one second assembled battery to the first assembled battery to fully charge the first assembled battery; and a step of calculating, by the control device, a full charge capacity of the first assembled battery based on a transition from a fully discharged state to a fully charged state.

(2) A program that causes one or more processors (e.g., the processor 131 of the ECU 13) to execute the steps of the control method.

(3) A non-transitory computer-readable storage medium storing the program. It should be considered that the embodiments disclosed above are for illustrative purposes only and are not limitative of the disclosure in any aspect. The scope of the present disclosure is defined by the terms of the claims, and is intended to include any modifications within the scope and meaning equivalent to the terms of the claims.

What is claimed is:

1. A power storage system that performs charging and discharging with an external system, the power storage system comprising:

a power converter;

a plurality of assembled batteries connected in parallel with each other to the power converter; and a control device that controls an operation of the power converter, wherein:

the control device operates the power converter such that power is supplied from a designated first assembled battery of the plurality of the assembled batteries to at least one designated second assembled battery of the plurality of the assembled batteries to fully discharge the first assembled battery;

the control device operates the power converter such that power is supplied from the at least one second assembled battery to the first assembled battery to fully charge the first assembled battery;

the control device calculates a full charge capacity of the first assembled battery based on a transition from a fully discharged state to a fully charged state;

the control device stores information for specifying a length of a wire between the first assembled battery and a remaining plurality of assembled batteries excluding the first assembled battery from the plurality of the assembled batteries; and the control device designates, based on the information, an assembled battery having the shortest length of a wire with respect to the first assembled battery among the remaining plurality of the assembled batteries, as one of the at least one second assembled battery.

2. The power storage system according to claim 1, further comprising a sensor device that measures a temperature of each of the plurality of the assembled batteries, wherein the control device designates an assembled battery having the highest temperature among the remaining plurality of the assembled batteries excluding the first assembled battery from the plurality of the assembled batteries, as one of the at least one second assembled battery.

* * * * *